US008725866B2

(12) United States Patent
Borade et al.

(10) Patent No.: US 8,725,866 B2
(45) Date of Patent: May 13, 2014

(54) METHOD AND SYSTEM FOR LINK COUNT UPDATE AND SYNCHRONIZATION IN A PARTITIONED DIRECTORY

(75) Inventors: Rahul Ravindra Borade, Maharashtra (IN); Anindya Banerjee, Pune (IN); Kedar Patwardhan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 489 days.

(21) Appl. No.: 12/857,460

(22) Filed: Aug. 16, 2010

(65) Prior Publication Data
US 2012/0042063 A1 Feb. 16, 2012

(51) Int. Cl.
*G06F 15/173* (2006.01)

(52) U.S. Cl.
USPC ............................... 709/224; 726/1; 707/770

(58) Field of Classification Search
USPC ....................................................... 709/224
See application file for complete search history.

(56) References Cited

U.S. PATENT DOCUMENTS

| 2004/0003086 A1 | 1/2004 | Parham et al. |
| 2004/0215900 A1 | 10/2004 | Guthrie et al. |
| 2005/0149749 A1 | 7/2005 | Van Brabant |
| 2005/0273571 A1 | 12/2005 | Lyon et al. |
| 2006/0080674 A1 | 4/2006 | Bes et al. |
| 2007/0083715 A1 | 4/2007 | Vanderpool |
| 2008/0071811 A1 | 3/2008 | Parkinson et al. |
| 2008/0244189 A1 | 10/2008 | Allison et al. |
| 2009/0019514 A1* | 1/2009 | Hazlewood et al. ............ 726/1 |
| 2009/0178105 A1* | 7/2009 | Feng et al. ........................ 726/1 |
| 2009/0178106 A1* | 7/2009 | Feng et al. ........................ 726/1 |
| 2009/0204571 A1* | 8/2009 | Shizuno ........................... 707/2 |
| 2010/0057697 A1* | 3/2010 | Golwalkar et al. ............ 707/4 |
| 2011/0082879 A1* | 4/2011 | Hazlewood et al. .......... 707/770 |
| 2011/0307543 A1 | 12/2011 | Megginson |

* cited by examiner

*Primary Examiner* — Hua Fan
(74) *Attorney, Agent, or Firm* — Wilmer Cutler Pickering Hale and Dorr LLP

(57) ABSTRACT

A method of updating a link count in a partitioned directory shared by a plurality of computers within a cluster. The partitioned directory is traversed once by a first computer to obtain a link count. The link count is stored in the first computer and broadcast to a cluster of computers. A total number of allocated links is less than a maximum limit on link count minus the link count. A respective number of links is allocated to each computer within the cluster. Delta values of each computer are updated in real-time as subdirectories are created/erased. A delta value associated with each of the plurality of computers is received. A delta value represents a net number of links created or removed by each computer. The link count is updated based on the previous link count and further based on each of the delta values and further based a delta value associated with the first computer. The updated link count is stored by the first computer and broadcast to the plurality of computers.

20 Claims, 12 Drawing Sheets

200

METHOD AND SYSTEM FOR LINK COUNT UPDATE AND SYNCHRONIZATION IN A PARTITIONED DIRECTORY

TECHNICAL FIELD

Embodiments of the present invention generally relate to systems for tracking the number of subdirectories of a partitioned directory within a computer system.

BACKGROUND

In general, a computer directory may be partitioned into subdirectories that are either hidden or visible. The number of visible subdirectories is generally referred to as the link count. In many systems, the link count needs to be maintained below a maximum limit. The link count may be reported during various operations including statistical calls associated with a partitioned directory from one or more users.

One of the advantages of a partitioned directory is to enable multiple users to simultaneously access content within the partitioned directory. Access to a partitioned directory may include the creation or removal of one or more subdirectories, thereby causing a change to the link count. However, within the directory, its link count should be maintained below a maximum limit while enabling multiple users to access the partitioned directory in parallel. In other words, all the possible modifications, such as creation or removal of subdirectories at any given node of the partitioned directory, have to be accounted for during a read operation associated with the link count.

Accordingly, the link count should be continually updated to ensure that the maximum limit has not been reached. Moreover, the link count may be determined during a statistical call, as described above.

Unfortunately, traversal of the entire partitioned directory by each user is required by the prior art prior to creating a new subdirectory, to determine the link count in order to ensure that the maximum limit associated with the link count has not been reached. Furthermore, traversal of the entire partitioned directory may be required during a statistic call. However, traversal of the entire partitioned directory by each user is disadvantageous because: 1) not only is it time consuming but; 2) it also burdens computer resources associated with each user.

An alternative method to ensure that the link count is less than the maximum limit is to serialize user accesses associated with modifications to the partitioned directory. In this fashion, the user modifying the partitioned directory can track the number of changes and can account for the link count number without having to account for modifications by other users. Unfortunately, serializing user accesses increases the wait time associated with each user and is therefore disadvantageous.

SUMMARY

Accordingly, a need has arisen to allow simultaneous modification to a partitioned directory which can change the link count associated with a partitioned directory while maintaining that the link count remain below a maximum limit. Moreover, a need has arisen to track the link count and to synchronize the link count with other users without requiring a traversal through the entire partitioned directory more than once. It will become apparent to those skilled in the art after reading the detailed description of the present invention that the embodiments of the present invention satisfy the above mentioned needs.

According to one embodiment, a computer (hereinafter a primary computer) from a cluster of computers exclusively accesses a memory component. The memory component stores a partitioned directory. For example, the memory component may store a partitioned "/home" directory that may contain a combination of hidden and visible subdirectories, for instance.

In one embodiment, the partitioned/home directory is completely traversed by a primary computer system in order to initially obtain the link count, e.g., the number of visible subdirectories as well as the dot and the dotdot entries, in some cases. Thereafter, the exclusive access is terminated and the link count is stored by the primary computer. The link count is subsequently communicated to other computers within the cluster.

In one embodiment, in a series of communications, the primary computer may allocate a number of links to each of the other computers within the cluster. The allocated links may be used by each computer to create additional visible subdirectories up to this maximum. It is appreciated that the total number of allocated links is the maximum number of allowed links minus the current link count. In one exemplary embodiment, the total number of allocated links may be equally distributed among the computers within the cluster.

According to one embodiment, each computer in real-time tracks a number of visible subdirectories created/removed by that computer. For example, a delta value may be used and incremented each time a visible subdirectory is created and decremented each time a visible subdirectory is removed. This is done by each computer within the cluster that shares the partitioned directory.

Moreover, the number of allocated links associated with each computer is updated in response to the creation/deletion of a visible subdirectory. For example, the number of allocated links associated with a second computer is decremented by three if three visible subdirectories are created by the second computer.

The delta values from each of the computers within the cluster may be transmitted to the primary computer periodically for update, e.g., upon receiving a statistical call. As such, the link count may be updated by the primary computer when the delta values of each of the computers including the delta value of the primary computer are added to the previous link count. Thus, the link count is advantageously updated without any need to traverse the partitioned/home directory.

According to one embodiment, a computer within a cluster of computers may make a request for additional links once the number of allocated link counts associated with that computer reaches a certain threshold, e.g., zero. For example, a third computer may request for additional links once it has used up the links allocated by the primary computer. The request is received by the primary computer. In response, the primary computer may broadcast the request to other computers within the cluster. In one exemplary embodiment, any computer within the cluster that has unused links may transfer a certain number of links to the third computer. The number of allocated links for each of the computer is adjusted accordingly after a certain number of links are transferred.

In one embodiment, however, the primary computer may assign a certain number of links to every computer within the cluster and overwrite the previous number of allocated links. It is appreciated, however, that the primary computer ensures that the total number of allocated links is less than the maximum number of allowed links by the system minus the current link count. For example, the primary computer may assign maximum number of allowed link minus the current link count all divided by a number of computers within the cluster.

Accordingly, the number of link counts is updated and the allocation of a certain number of link counts to each computer ensures that the total number of link counts is below the maximum number of allowed link counts. Furthermore, tracking the link count within the partitioned directory and dynamically allocating links to different computers within the cluster while maintaining the link count below the maximum number of allowed link counts are achieved with traversing the partitioned directory only once.

In other words, simultaneous modification to the link count associated with a partitioned directory is achieved while maintaining the link count below a maximum limit. Moreover, tracking the link count and synchronizing the link count with other computers is achieved by traversing the partitioned directory only once.

More particularly, a method of updating link count value in a partitioned directory includes traversing the partitioned directory once to obtain an initial link count. The traversing is performed by a first computer of a plurality of computers. The link count is stored in the first computer. The first computer broadcasts the link count to the plurality of computers. The first computer receives a delta value from each of the plurality of computers, where the delta value represents a net number of links created or removed by each computer. The link count at the first computer is updated to form an updated link, wherein the updating is based on the initial link count and further based on each of the delta values and further based on a delta value associated with the first computer. The updated link count is stored in the first computer. The updated link count is broadcasted to the plurality of computers.

It is appreciated that the link count may partially be obtained by counting a number of flags associated with visible directories within the partitioned directory. It is further appreciated that the traversing may occur holding an exclusive lock on the directory by the first computer.

According to one embodiment, the first computer may allocate a first number of links to each of the plurality of computers. In one exemplary embodiment, a total number of allocated links is less than a maximum limit on link count minus the current link count. It is appreciated that the first number of links associated with a second computer of the plurality of computers is decremented by one for every visible directory created by the second computer.

In one embodiment, the first computer receives a request from the second computer to allocate additional number of links to the second computer if the first number of links associated with the second computer reaches a threshold value, e.g., zero. In one exemplary embodiment, the first computer broadcasts the request to the plurality of computers. In response to broadcasting the request, the first computer receives a second number of links from a third computer to be allocated to the second computer. It is appreciated that the second number links is deducted from the first number of links associated with the third computer. The first computer transmits the second number of links to the second computer and overwrites its previous allocated number of links.

In an alternative embodiment, the first computer in response to the request for additional links allocates a third number of links to each of the plurality of computers. The third number of links is maximum limit on link count minus the link count all divided by a number of the plurality of computers. The number of allocated links of each of the computers within the cluster is overwritten with the third number of links.

DETAILED DESCRIPTION

Figure 1:
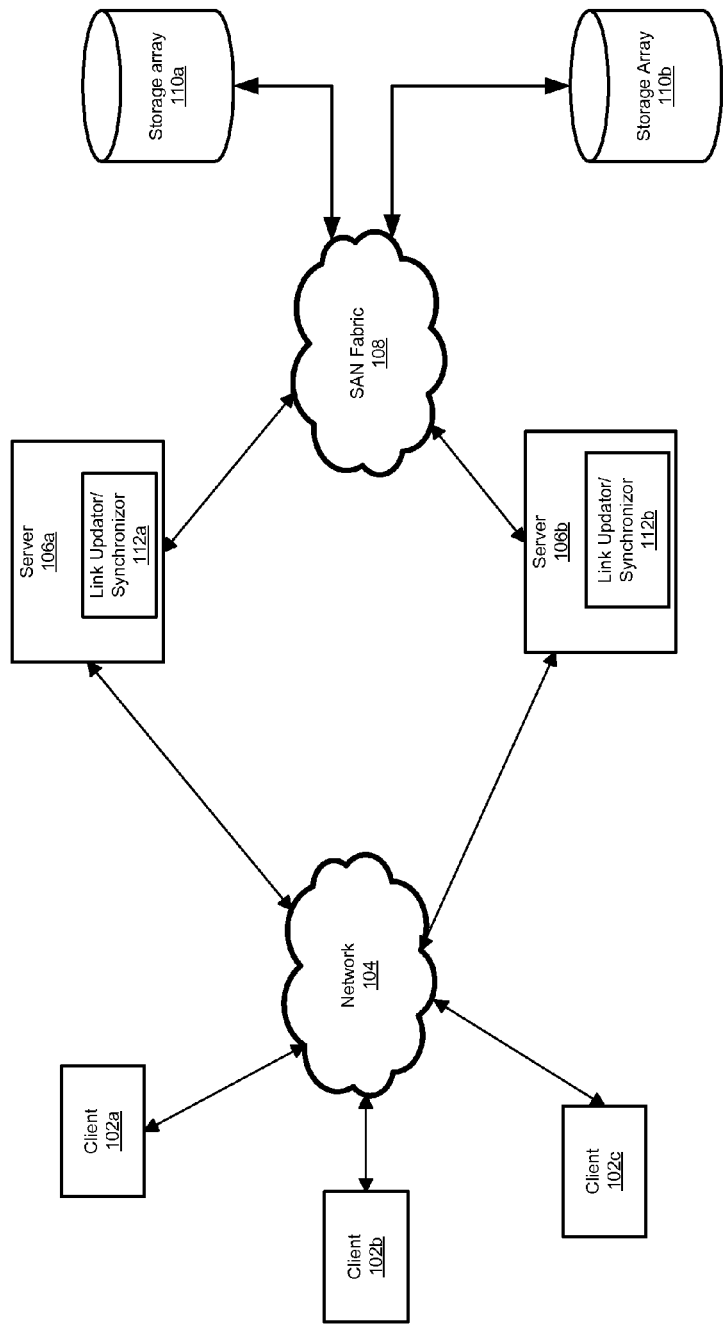
FIG. 1 shows a block diagram of an exemplary computer system operating environment that may serve as a platform in accordance with one embodiment of the present invention.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "creating," "generating," "receiving," "storing," "determining," "sending," "providing," "accessing," "associating," or "reading" or "writing" or "partitioning" or "traversing" or broadcasting" or "updating" or "allocating" or "transmitting" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Exemplary Operating Environment

FIG. 1 shows a block diagram of an exemplary operating environment in which various embodiments of the present invention can operate. Exemplary operating environment 100 includes clients 102a-c, networks 104, servers 106a-b, storage area network (SAN) fabric 108, and storage arrays 110a-b. It is appreciated that that components of exemplary operating environment 100 are exemplary and more or fewer components may be present in various configurations. It is appreciated that operating environment may be part of a distributed computing environment, a cloud computing environment, a client server environment, etc.

Client systems 102a-c access information on storage arrays 110a-b via servers 106a-b using, for example, a web browser or other suitable client communication software (not shown). FIG. 1 depicts the use of a network 104 such as the Internet for exchanging data, but the present disclosure is not limited to the Internet or any particular network-based environment.

Each of servers 106a-b can have multiple clients (e.g., clients 102a-c) connected thereto. Servers 106a-b can be a variety of server types including, but not limited to, database servers, network file system (NFS) servers, and application servers. In some embodiments, servers 106a-b have access to shared storage of storage arrays 110a-b with each of servers 106a-b having its own respective clustered file system and its own built-in lock manager thereby allowing servers 106a-b to access the shared storage. Each of servers 106a-b may communicate with each other over a network (e.g., a redundant private network) (not shown). Servers 106a-b may be linked to storage arrays 110a-b in a variety of ways including, fibre channel.

Servers 106a-b may respectively use link update/synchronizor 112a-b, in accordance with embodiments of the present invention to update link counts and synchronize the link counts among computers within a cluster of computers simultaneously accessing a partitioned directory. According to one embodiment, either link update/synchronizor 112a or the link update/synchronizor 112b from a cluster of computers exclusively accesses a memory component. The memory component stores a partitioned directory. For example, the memory component may store a partitioned/home directory that may contain a combination of hidden and visible subdirectories.

In one embodiment, the partitioned "/home" directory is traversed to obtain the initial link count, e.g., the number of visible subdirectories as well as the dot and the dotdot entries, in one example. Afterwards, the exclusive access is terminated, the exclusive lock released and the link count is stored by the link update/synchronizor that had exclusive access, e.g., link update/synchronizor 112a. The link count is subsequently communicated to other computers within the cluster.

In one embodiment, the link update/synchronizor 112a determines and allocates a maximum number of links to each computer within the cluster. The allocated links may be used by each of the computers to create additional visible subdirectories up to the designated number. It is appreciated that the total number of allocated links is the maximum number of allowed links within the system minus the initial link count. In one exemplary embodiment, the total number of allocated links may be equally distributed among the computers within the cluster or could be allocated based on any determination or priority.

According to one embodiment, each computer thereafter in real-time tracks a number of visible subdirectories created/removed by that computer. For example, a delta value may be used and incremented each time a visible subdirectory is created and decremented each time a visible subdirectory is removed.

Moreover, the number of allocated links associated with each computer is updated in response to the creation/deletion of a visible subdirectory. For example, the number of allocated links associated with a second computer is decremented by three if three visible subdirectories are created by the second computer.

The delta values from each of the computers within the cluster are transmitted to the link update/synchronizor 112a for update. Alternatively, the delta values are pulled by the link update/synchronizor 112a for update. As such, the link count may be updated by the link update/synchronizor 112a when the delta values of each of the computers including the delta value of the link update/synchronizor 112a are added to the previous link count. Thus, the link count is updated without any need to again traverse the partitioned/home directory.

According to one embodiment, a computer within a cluster of computer may request for additional links once its number of allocated link counts reaches a certain threshold, e.g., zero. For example, a third computer may request for additional links once it has used up the links allocated by the primary computer. The request is received by link update/synchronizor 112a. The link update/synchronizor 112a may broadcast the request to other computers within the cluster. In one exemplary embodiment, any computer within the cluster that has unused links may transfer a certain number of links to the third computer. The number of allocated links for each of the computers is adjusted accordingly after a certain number of links are transferred.

In one embodiment, however, the link update/synchronizor 112a may assign a certain number of links to every computer within the cluster and overwrite the previous number of allocated links. It is appreciated, however, that the link update/synchronizor 112a ensures that the total number of allocated links is less than the maximum number of allowed link minus the current link count. For example, the link update/synchronizor 112a may assign maximum number of allowed link minus the current link count all divided by a number of computers within the cluster.

Accordingly, the link count is updated and the allocation of a maximum number of link counts to each computer ensures that the total number of link counts remains below the maximum number of allowed link counts within the shared system. Furthermore, tracking the link count within the partitioned directory and dynamically allocating links to different computers within the cluster while maintaining that the link count remains below the maximum number of allowed link counts are all achieved within a system that requires traversal of the partitioned directory only once.

Thus, simultaneous modification to the link count associated with a shared partitioned directory is achieved while maintaining the link count below a maximum limit. Further, the link count is tracked and synchronized with other computers by traversing the shared partitioned directory only once.

Figure 2:
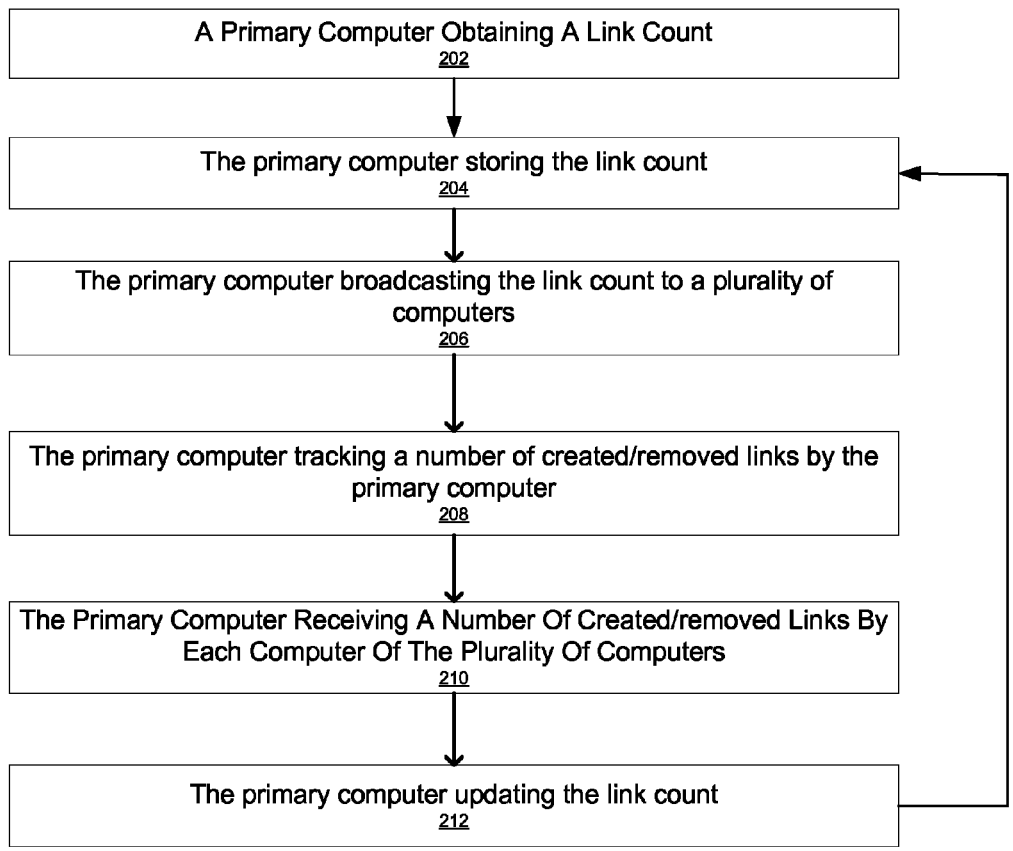
FIG. 2 shows an exemplary flow diagram for tracking link counts in a partitioned directory in accordance with one embodiment of the present invention.

A Method and System for Link Count Update and Synchronization of a Partitioned Directory Referring now to FIG. 2, an exemplary computer implemented flow diagram 200 for tracking link counts in a partitioned directory in accordance with one embodiment of the present invention is shown. This process is cooperatively implemented by computer systems that share a partitioned directory that needs to maintain a prescribed maximum number of link counts.

At step 202, a primary computer obtains an initial link count representative of the partitioned directory. The primary computer may be any of the computers within a cluster of computers that have shared access to the partitioned directory. It is appreciated that the primary computer obtains an exclusive access to the partitioned directory and then traverses the partitioned directory once in order to obtain the initial link count.

According to one embodiment, the initial link count may be obtained responsive to a statistical call from any one of the computers within the cluster. It is appreciated that the primary computer will maintain the link count to be less than the maximum allowed link count which is set by the system.

According to one embodiment, the initial link count is partially based on the number of visible subdirectories within the partitioned directory. For example, a flag may be associated with each visible subdirectory of the partitioned directory. As such, adding the number of flags and further adding two links that are associated with a dot and dotdot subdirectories provides the link count in one embodiment.

It is appreciated that the use of flags associated with visible subdirectories is exemplary and not intended to limit the scope of the present invention. For example, a counter may be used wherein the counter is incremented for each visible subdirectory during the creation and/or partitioning of the directory. As such, the value of the counter corresponds to the number of visible subdirectories within the partitioned directory.

At step 204, the primary computer stores the initial link count obtained during the directory traversal in a storage medium within the primary component. For example, the initial link count may be stored in a field associated with a data structure.

It is appreciated that according to one embodiment, at step 206, the primary computer broadcasts the link count to other computers within the cluster having access to the partitioned directory. The link count received by each of the computers within the cluster may similarly be stored in a field associated with their respective data structure.

It is appreciated that the data structure associated with each computer may also include a field, hereinafter delta filed, that tracks a number of visible subdirectories created by its corresponding computer. Similarly, the delta field may track a number of visible subdirectories that are removed by its corresponding computer. For example, the delta field may be incremented responsive to creation of a visible subdirectory and decremented responsive to removal of a visible subdirectory.

At step 208, the primary computer tracks a number of created/removed links, e.g., visible subdirectories, it creates and deletes by using its delta field associated therewith. For example, the delta field may be incremented responsive to creation of a visible subdirectory and decremented responsive to removal of a visible subdirectory. For example, the delta field value of three indicates that the primary computer has overall created three visible subdirectories within the partitioned directory. On the other hand, the delta field value of minus 5 may indicate that the primary computer has overall removed five visible subdirectories from the partitioned directory. In other words, the respective delta field value of a computer indicates the total number visible subdirectories created or removed by that computer.

It is appreciated that each computer within the cluster of computers in real-time tracks the number of visible subdirectories created/removed by that computer using its associated delta field and communicates the delta value to the primary computer. At step 210, the primary computer receives the delta values associated with each of the computers within the cluster. Each of the delta values indicates the overall gain or loss of visible subdirectories by each of the computers. Thus, overall net gain or loss of link count by each computer is received by the primary computer.

At step 212, the primary computer updates the initial link count based on its own delta value and further based on the received delta values associated with computers within the cluster and generates an updated link count. For example, the updated link count may be updated by adding all the delta values to the initial link count.

It is appreciated that at this stage the process repeats. For example, the updated link count may now be stored by the primary computer. Subsequently, the updated link count may be broadcasted to all of the computers within the cluster. Each of the computers within the cluster receives and stores the updated link count. As such, every computer within the cluster is synchronized with the primary computer in having the most up-to-date link count. Advantageously, the use and broadcast of the delta values allows the primary computer to compute, in real-time, an updated link count value without needing to traverse the partitioned directory but once.

Figure 3:
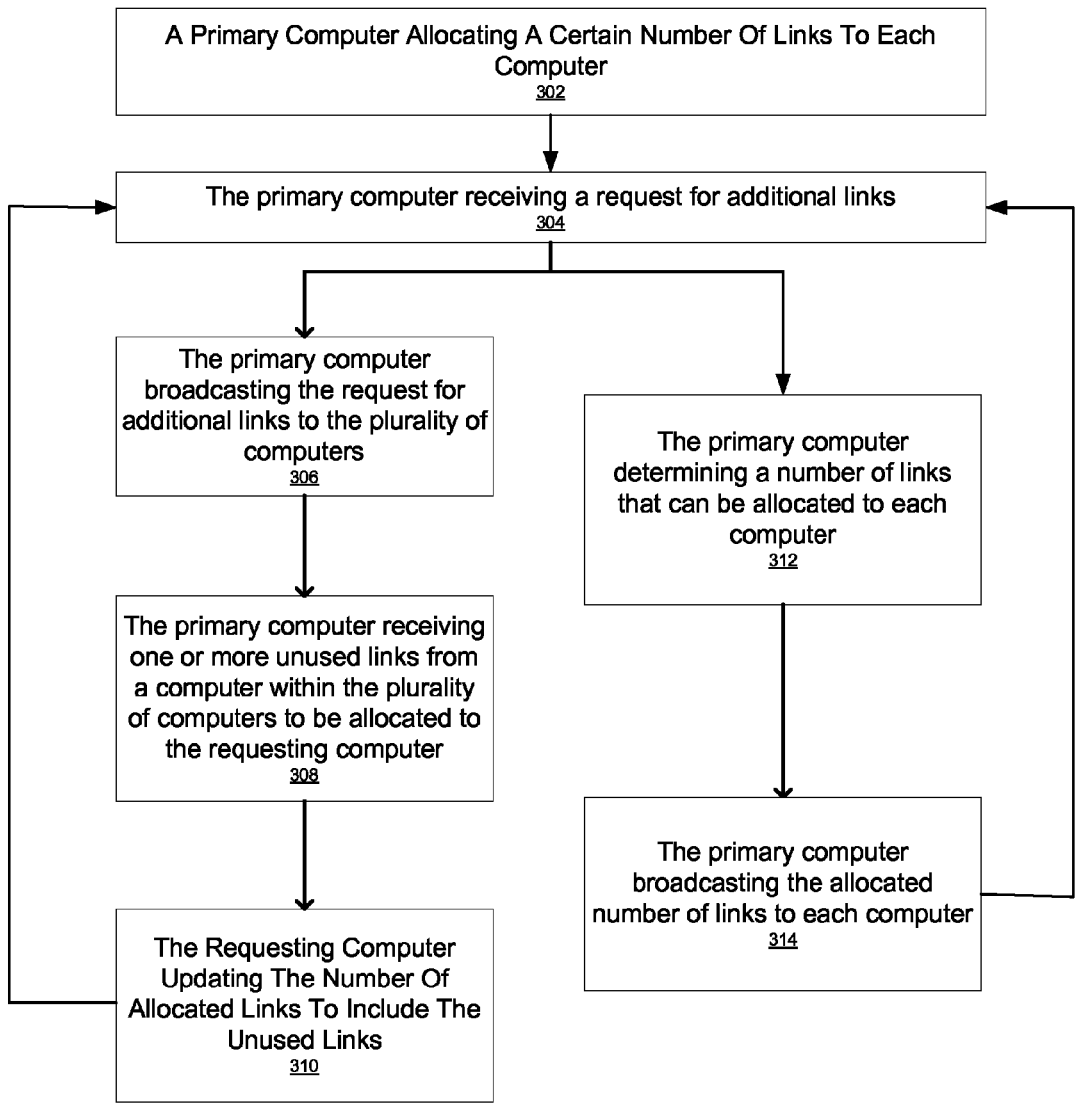
FIG. 3 shows an exemplary flow diagram for allocating links to computers within a cluster of computers to access a partitioned directory in accordance with one embodiment of the present invention.

FIG. 3 illustrates another method in accordance with another embodiment of the present invention that provides link allocation between the computer systems of the cluster. Referring now to FIG. 3, an exemplary flow diagram 300 of a process for allocating links to computers within a cluster of computers accessing a shared partitioned directory in accordance with one embodiment of the present invention is shown. It is appreciated that the allocation of links to computers within the cluster may be carried out simultaneously with tracking link counts, as presented in FIG. 2. As described in more detail below, a given computer of the cluster may not create more visible subdirectories than the amount it was allocated.

For example, at step 302, simultaneous with obtaining the link count, as presented by step 202 or after the link count is obtained, the primary computer allocates a certain number of links to each of the computers within the cluster. Each allocation can be custom to the particular machine, or the allocation can be uniform across all the cluster. In one embodiment, the number of allocated links associated with a given computer is stored in a data structure along with the link count and the delta value field associated therewith. It is further appreciated that the maximum allowed link count may also be stored in a field of the data structure associated with each of the computers.

It is appreciated that the total number of allocated links across the entire cluster is less than the maximum allowed link count for the directory minus the link count obtained from step 202. In one embodiment, the allocated links are distributed evenly among the computers within the cluster. In an alternative embodiment, the allocated links may be distributed unevenly among the computers within the cluster, e.g., one computer may get twice as many links as another computer, based on any distribution system, priority, etc.

It is appreciated that the number of allocated links associated with a computer is decremented in real-time by one for every visible subdirectory created by that computer. The number of allocated links associated with a computer is incremented in real-time by one for every visible subdirectory deleted by that computer.

According to one embodiment, the allocated number of links given to a computer is its maximum number of visible subdirectories that it can create without interactions with other computers, assuming no deletions. For example, up to five visible subdirectories may be created by a computer having five links allocated thereto.

In one embodiment, at step 304 of FIG. 3, the primary computer receives a request for additional links to be allocated. The request may be generated by a computer within the cluster where its allocated number of links has reached a minimum threshold value, e.g., zero. For example, a computer within a cluster may send the request for an additional number of links to be allocated when it has used all of its allocated links. However, it is appreciated that the request may be sent before the entire allocated links are used.

In one exemplary embodiment, at step 306, the primary computer broadcasts the request for additional links to the computers within the cluster. For example, the broadcast for additional links may be a request from the primary computer to transfer some of the unused allocated links of another computer to the requesting computer.

According to one embodiment, at step 308, the primary computer may receive a response from one or more of the computers within the cluster that one or more unused allocated links of that computer may be transferred to the requesting computer. For example, a second computer may respond that ten allocated links are unused and that eight of the ten unused allocated links may be transferred to the system requesting additional links.

In one embodiment, at step 310, the primary computer may allocate a number of unused links of the responding computer to the requesting computer. For example, the primary computer may allocate six of those ten unused links to the requesting computer. The number of allocated links for the responding computer and the requesting computer may be updated.

It is appreciated that the example provided herein shows transfer of links from one computer to another computer. However, multiple computers within the cluster may transfer links to the requesting computer within the cluster. Alternatively, the primary computer may have reserve links itself and may transfer the reserve links to the requesting system without any need to communicate with other systems within the cluster. For example, reserve links may be transferred by the primary computer to the requesting computer without broadcasting the number of reserved links being transferred to other computers within the cluster.

In an alternative embodiment, at step 312, in response to a request by the system needing more links, the primary computer may determine a number of links that may be allocated to each of the computers within the cluster. This means the primary computer may alter the given assignment of links itself to transfer unused links from one computer to another. It is appreciated that the primary computer may determine the new allocation of links so that the requesting system receives more links. The total number links that may be allocated is the maximum allowed link count for the partition minus the current link count.

At step 314, the primary computer allocates and broadcasts the numbers of links based on step 312 to computers within the cluster. In one exemplary embodiment, the number of allocated links to each computer is the maximum allowed link account minus the current link count all divided by the number of computers within the cluster with preference given to the requesting party for additional links. Accordingly, the number of allocated links for each computer within the cluster is overwritten by the new allocation.

It is appreciated, however, that links may be allocated in an uneven fashion. For example, one computer may receive three times as many links in comparison to another computer based on any of a number of well known distribution schemes and/or priority schemes. It is further appreciated that the primary computer may allocate links to only the requesting computer and leave the allocated links of the remaining computers within the cluster unchanged.

Figure 4A:
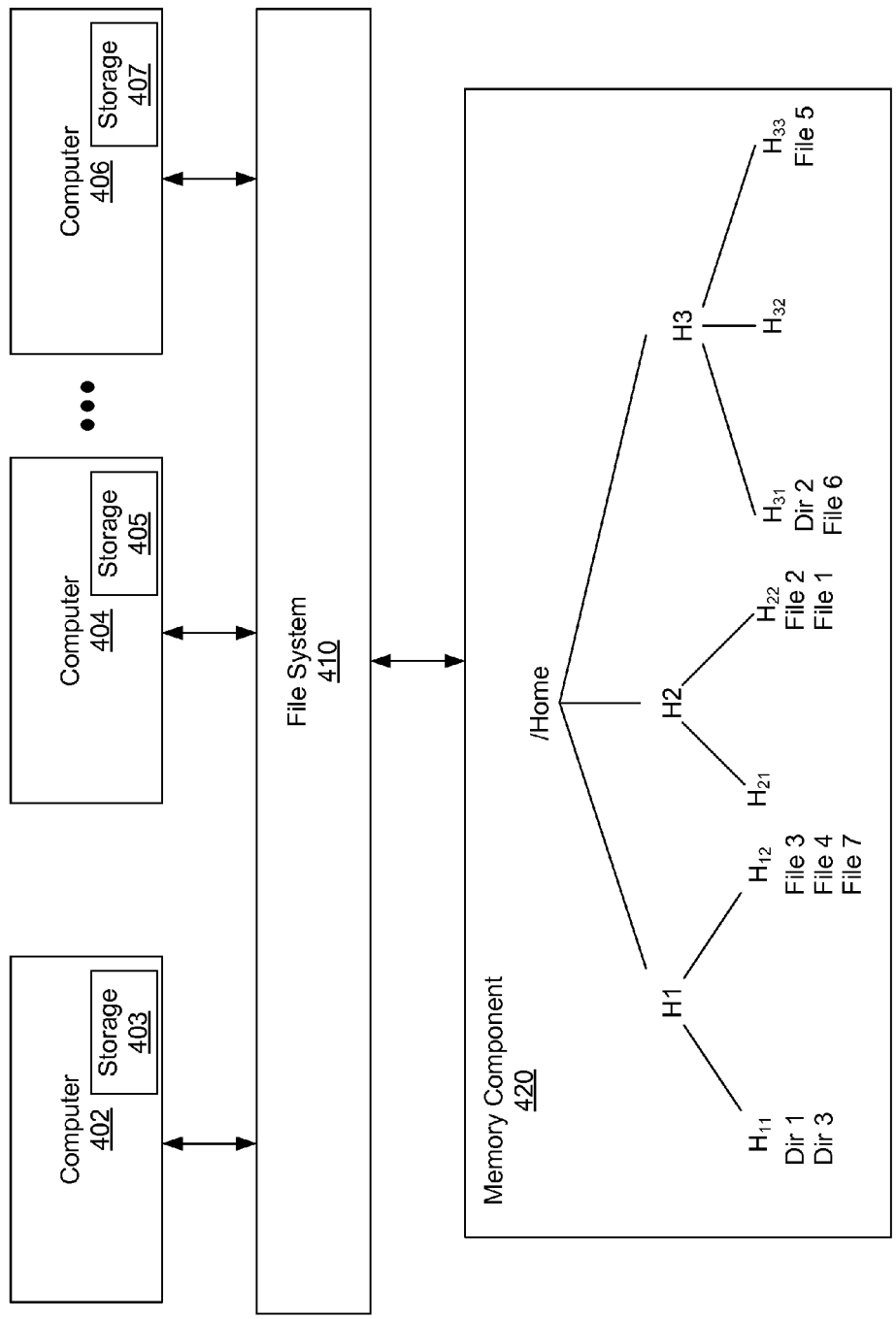
FIGS. 4A-4G show exemplary embodiments associated with tracking and allocating links to computers within a cluster of computers in accordance with embodiments of the present invention.

Referring now to FIGS. 4A-4G, exemplary embodiments associated with tracking and allocating links of a partitioned directory to computers within a cluster of computers in accordance with embodiments of the present invention are shown. Referring to FIG. 4A, a system 400 includes a cluster of computers 402, 404, and 406 coupled to a memory component 420 via a shared file system 410. According to this exemplary embodiment, each of the computers 402, 404, and 406 have storage components 403, 405, and 407 respectively associated therewith.

It is appreciated that the memory component 420 is operable to store a shared and partitioned directory, e.g., the "/home" directory for illustration. The partitioned directory may include a combination of visible and hidden subdirectories. For example, visible subdirectories include Dir 1, Dir2, and Dir 3. Hidden subdirectories include $H_1$, $H_2$, $H_3$, $H_{11}$, $H_{12}$, $H_{21}$, $H_{22}$, $H_{31}$, $H_{32}$, and $H_{33}$. It is appreciated that each of the visible subdirectories within the partitioned directory may have a corresponding flag. For example, a subdirectory with an asserted flag indicates that it is visible. Accordingly, the number of visible subdirectories may be determined by counting the asserted flags.

Figure 4B:
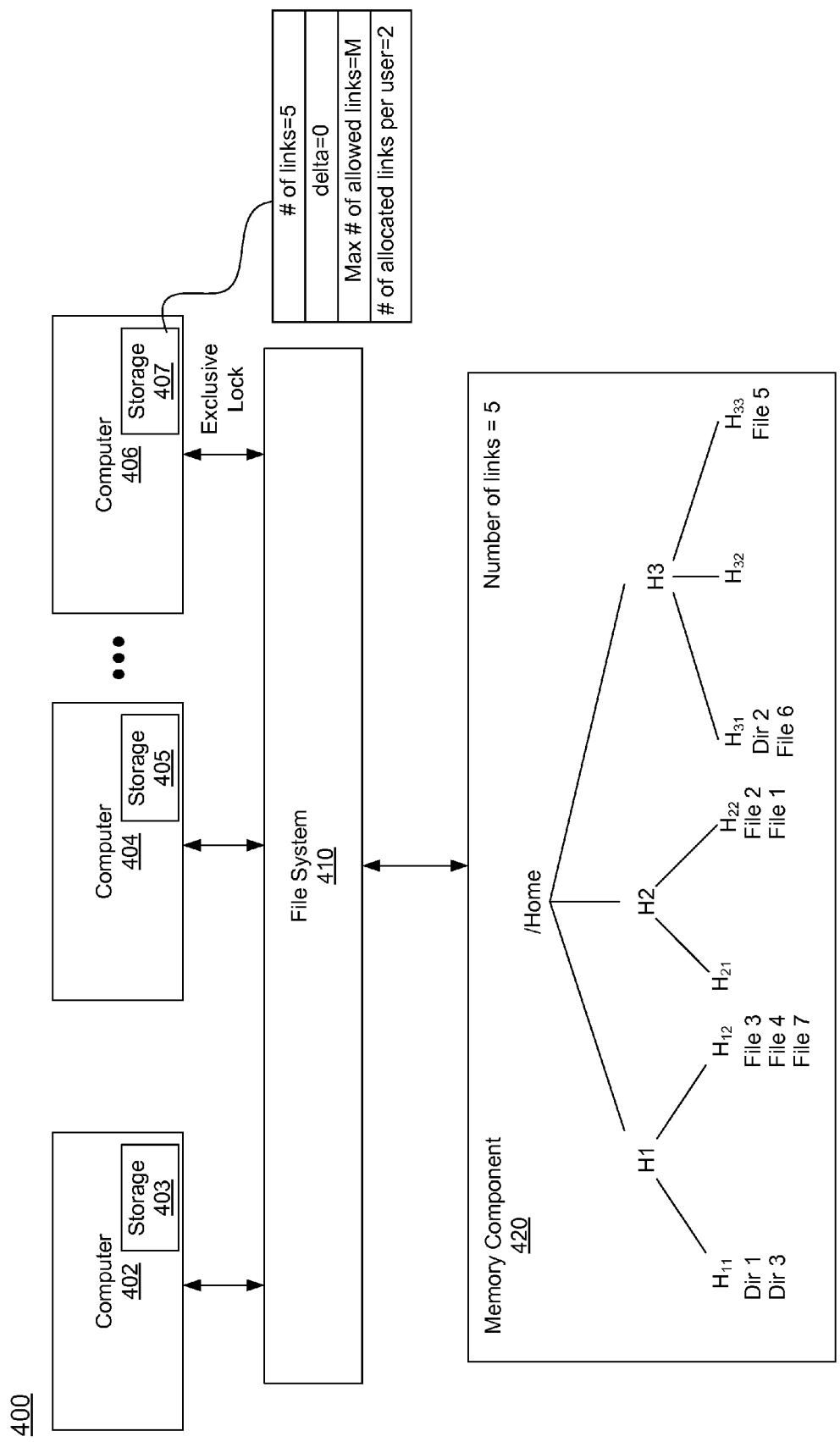

Referring now to FIG. 4B, one of the computers within the cluster, e.g., computer 406, designated herein as the primary computer system, exclusively accesses the partitioned directory. It is appreciated that an exclusive access requires an exclusive lock and temporarily renders the partitioned directory inaccessible to other computers. The computer 406 traverses the partitioned directory in order to obtain an initial link count. In one embodiment, the traversal is responsive to a statistical call from one of the computers within the cluster. Moreover, in one exemplary embodiment, the traversal occurs if the link count is indicated as zero.

The traversal indicates that the link count is five because of the three visible subdirectories, Dir 1, Dir 2, and Dir 3 along with the dot and dotdot subdirectories. The link count is stored in storage 407. The link count may be stored as part of a data structure also containing maximum number of allowed links, a delta field and a number of allocated links per user. According to one embodiment, the maximum number of allowed links is M. A delta value in the data structure may be used to track a number of visible subdirectories created/removed by that computer. The data structure may also have a field associated with a number of allocated links, e.g., 2. Allocated links indicate a maximum number of visible subdirectories that may be created by a given computer. In this exemplary embodiment, it is presumed that the number of allocated link is 2 and therefore computer 406 may create up to 2 visible subdirectories.

Figure 4C:
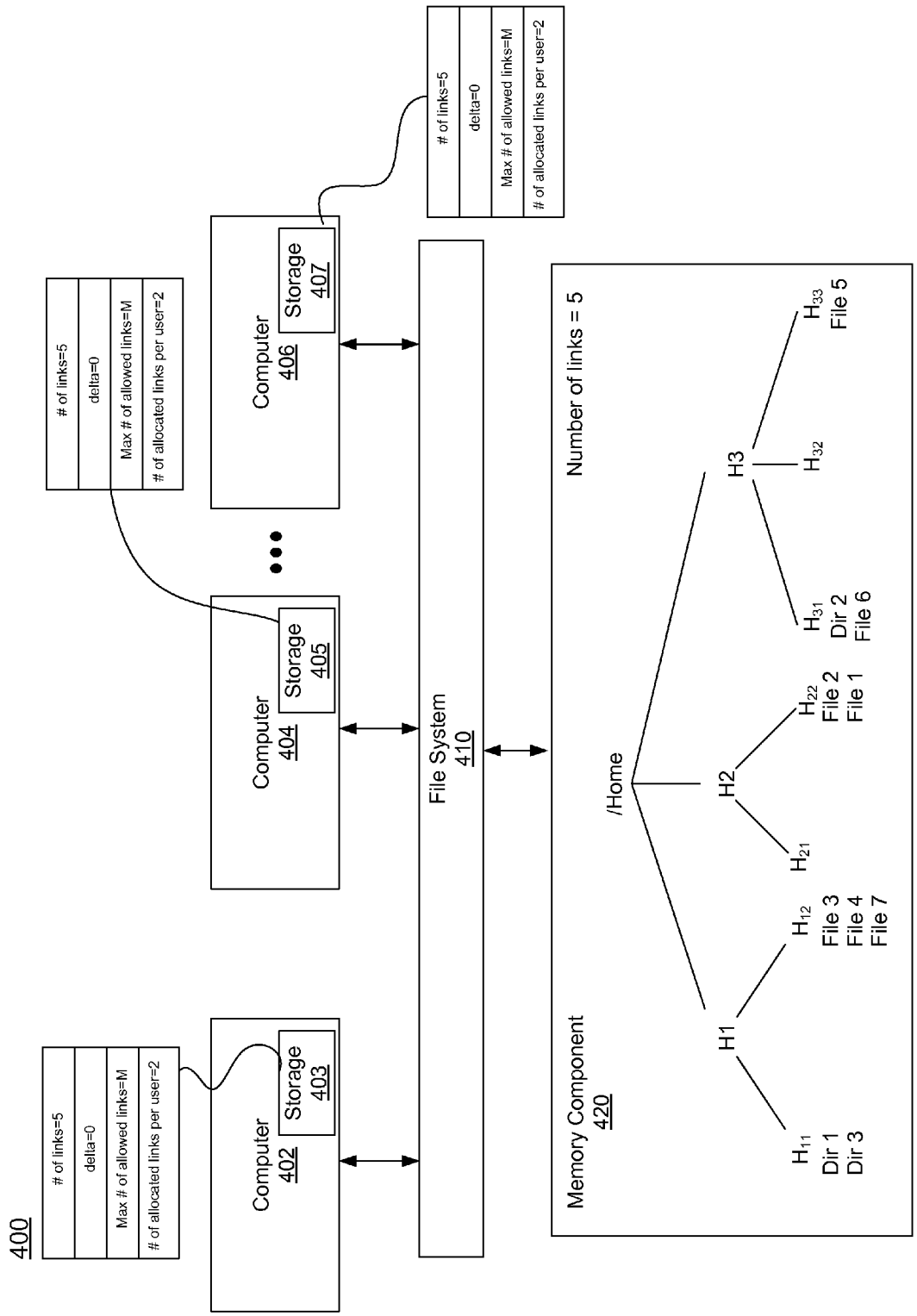

It is appreciated that the total number of allocated links should be less than the maximum number of allowed links minus the current link count. The data structure is stored in the storage 407 and the exclusive lock by computer 406 is released, as shown in FIG. 4C. Computer 406 communicates the data structure stored in the storage 407 to other computers within the cluster. Accordingly, the data structure stored at the storage 407 is duplicated and stored in storages 403 and 405 respectively.

Figure 4D:
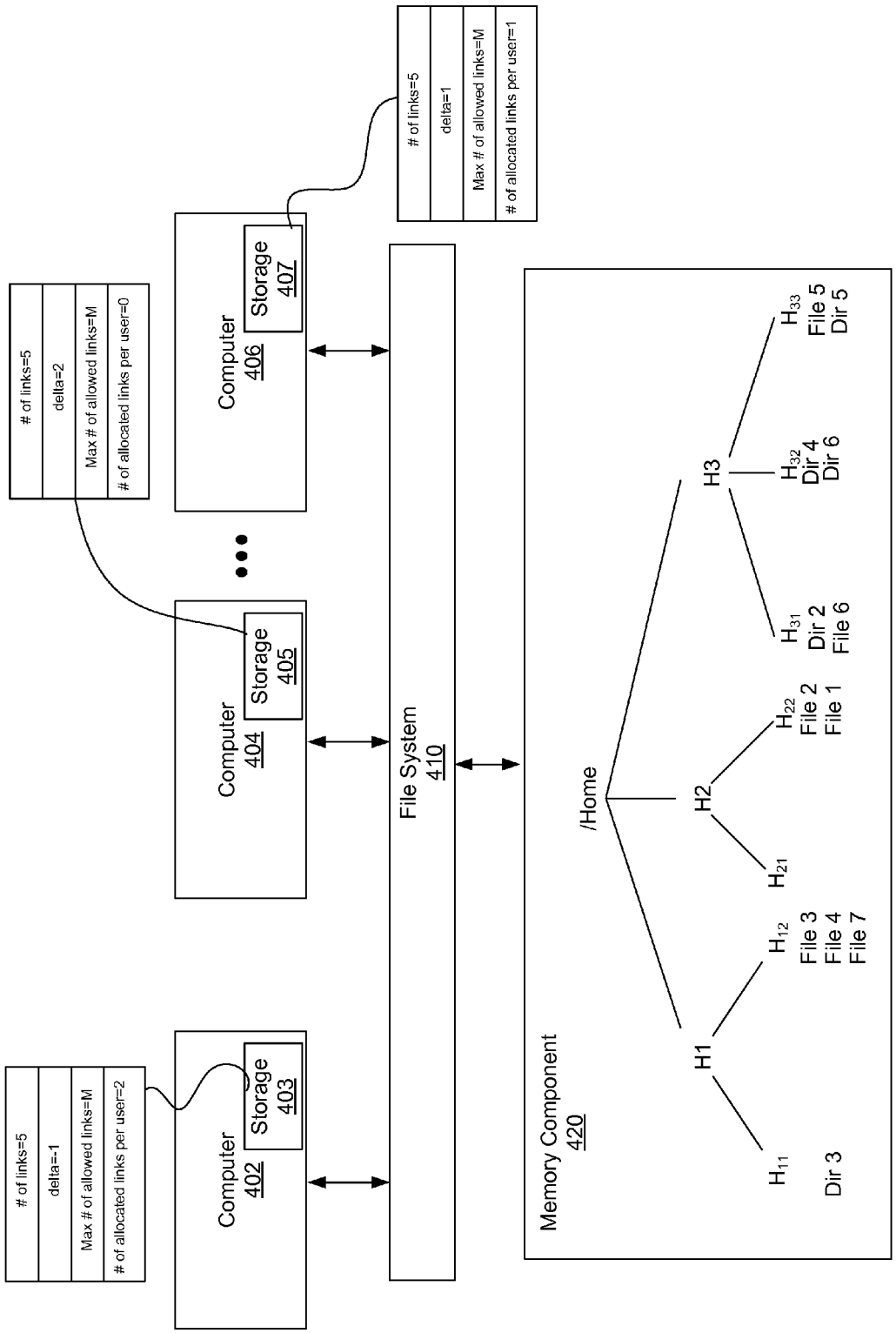

FIG. 4D illustrate the result when computer 402 removes a visible subdirectory from the partitioned directory. For example, the visible subdirectory Dir 1 is removed from the partitioned directory. As a result, the delta field associated with computer 402 is updated and decremented by one.

On the other hand, visible subdirectories are created by computers 404 and 406. For example, the visible subdirectories Dir 5 and Dir 6 are created by computer 404. Accordingly, the delta field of the computer 404 is updated and becomes two. The number of allocated links associated with computer 404 is on the other hand reduced by two because two visible subdirectories were created. In this example, the visible subdirectory Dir 4 is created by computer 406. As such, the delta field associated with computer 406 is updated and gets incremented by one. The number of allocated links associated with computer 406 is reduced by one because one visible subdirectory is created by computer 406.

Figure 4E:
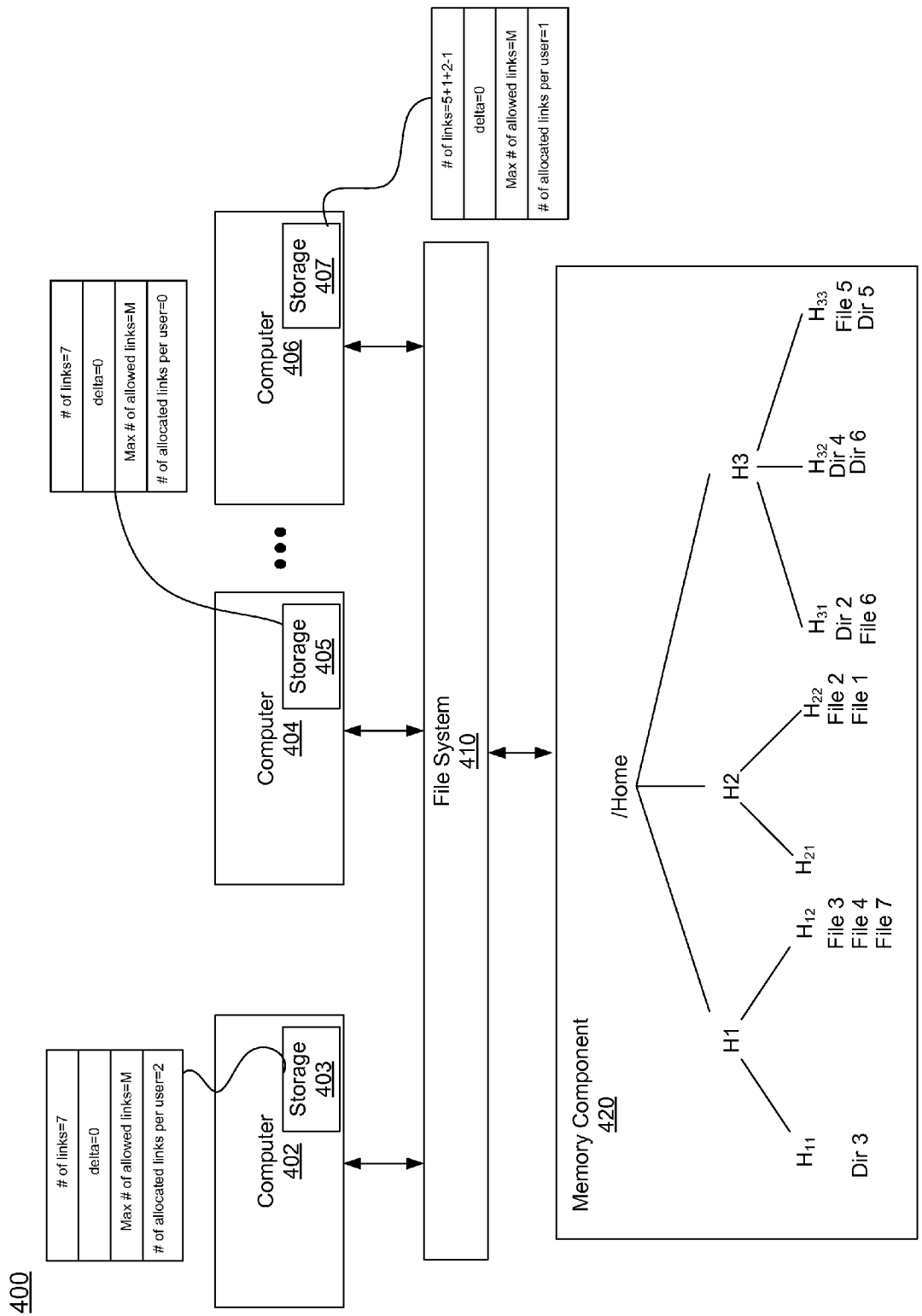

Referring now to FIG. 4E, the link count is updated by the primary computer system. For example, computer 406 receives the delta values associated with computers 402 and 404. The delta values associated with computers 402 and 404 are added to the delta value of computer 406 and further added to the previous link count. The delta values associated with each computer are then reset to zero.

Accordingly, the link count is updated to reflect the number of visible subdirectories created/removed by each of the computers within the cluster. In this example, the link count becomes 7 and the updated link count is communicated to computers 402 and 404. Accordingly, computers 402 and 404 become synchronized with computer 406 without having to traverse the partitioned directory.

Figure 4F:
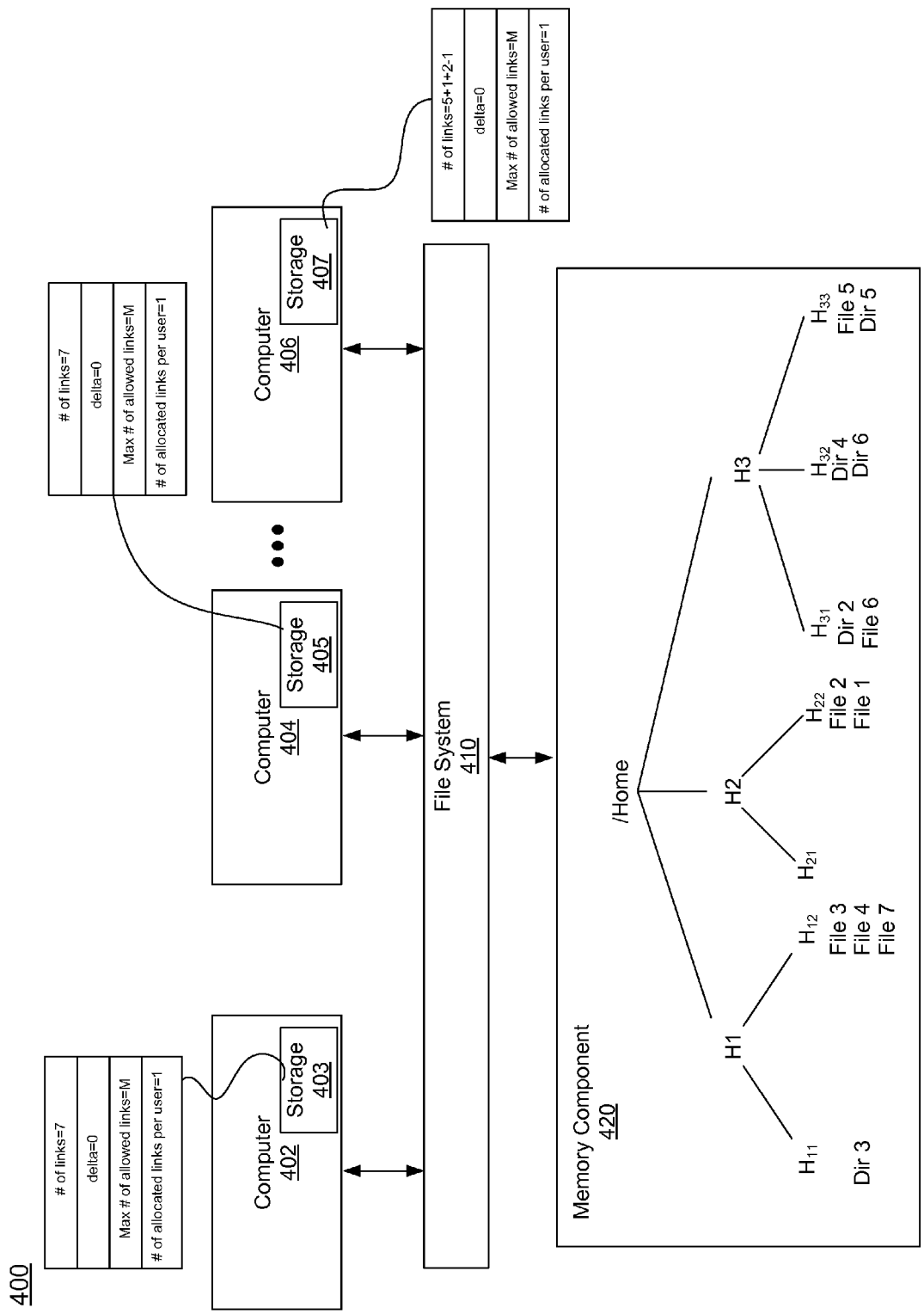

Referring now to FIG. 4F, computer 404 sends a request to computer 406 for additional links to be allocated. It is appreciated that the request may be sent when the number of allocated links associated with computer 404 reaches a threshold value, e.g., zero. In one exemplary embodiment, computer 406 broadcasts the request to other computers within the cluster. In response to the broadcast, computer 402 may respond by indicating that computer 402 still has two unused allocated links. Computer 406 may transfer any number of allocated links from computer 402 to the requesting computer 404. In this exemplary embodiment, one allocated link is transferred from computer 402 to computer 404. The number of allocated links within each computer is updated. In other words, the number of allocated links in computer 402 is now one and the number of allocated links in computer 404 is one. Computer 404 that used up all of its allocated links is now given more allocated links and is therefore accommodated.

Figure 4G:
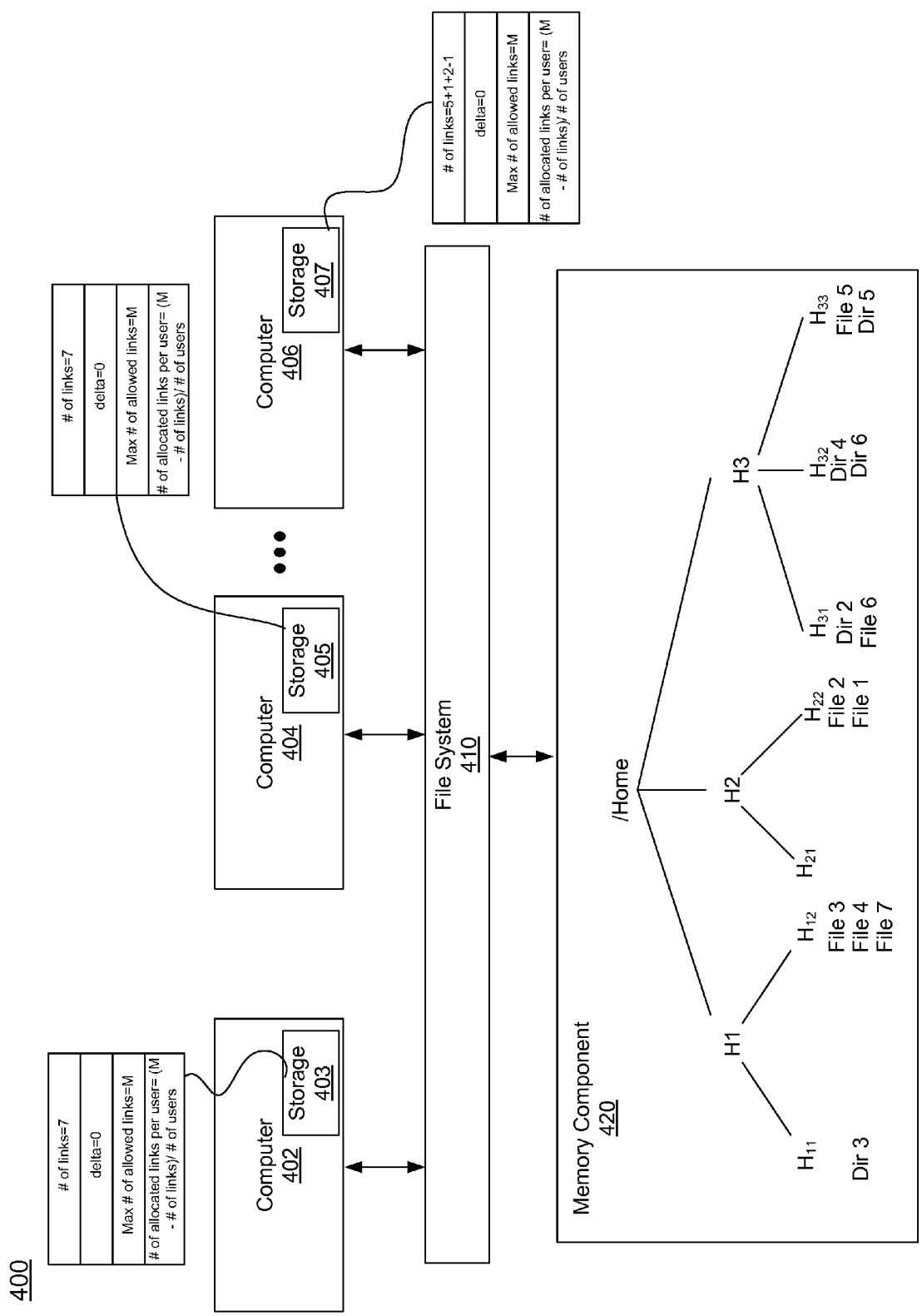

Referring now to FIG. 4G, computer 404 sends a request to computer 406 for additional links to be allocated. It is appreciated that the request may be sent when the number of allocated links associated with computer 404 reaches a threshold value, e.g., zero. In one exemplary embodiment, computer 406 may determine a number of links to be allocated to every computer. For example, computer 406 may determine that the number of links to be allocated to each computer is the maximum number of allowed links minus the current link count all divided by the number of computers within the cluster. This ensures that the number of links always remain below the maximum number of allowed links. It is further appreciated that the number of links allocated to the computers within the cluster may be distributed evenly or unevenly.

It is appreciated that the number of allocated links is communicated to each of the computers within the cluster once the number of links to be allocated is determined. As such, the number of allocated links in each corresponding data structure is overwritten by the new allocated number of links.

It is further appreciated that computer 406 may only allocate links to computer 404 without overwriting the allocated number of links in other computers. For example, computer 406 may allocate any remaining links to computer 404 while maintaining the number of allocated links to each of the computers the same.

Accordingly, the number of link count is updated and the allocation of a certain number of link counts to each computer ensures that the total number of link count is below the maximum number of allowed link count. Furthermore, tracking the link count within the partitioned directory and dynamically allocating links to different computers within the cluster while maintaining the link count below the maximum number of allowed link count are achieved with traversing the partitioned directory only once.

In other words, simultaneous modification to the link count associated with a partitioned directory is achieved while advantageously maintaining the link count below a maximum limit. Moreover, tracking the link count and synchronizing the link count with other computers is achieved within a system that only requires the partitioned directory to be traversed once.

Figure 5:
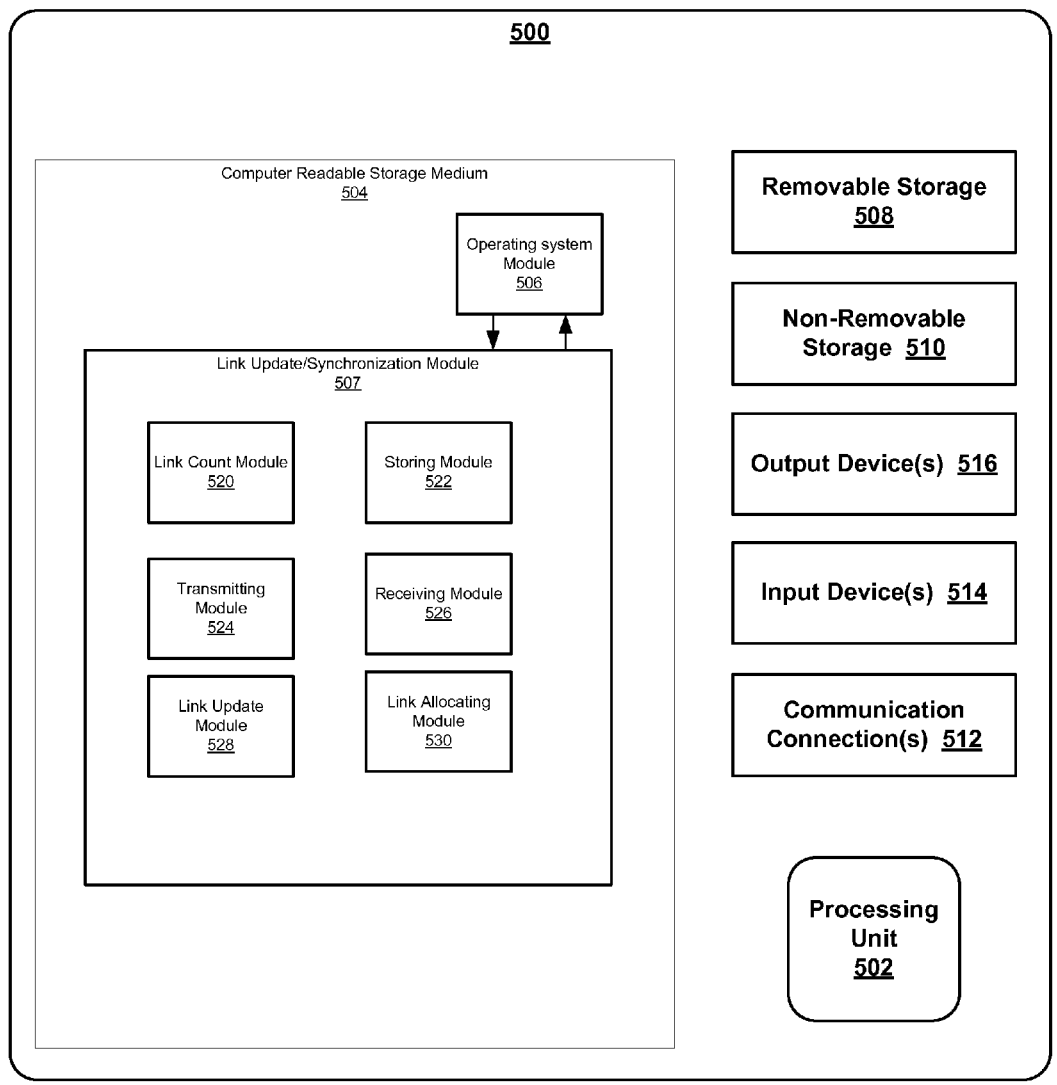
FIG. 5 shows a block diagram of an exemplary computer system in accordance with one embodiment of the present invention.

Referring now to FIG. 5, a block diagram of an exemplary computer system in accordance with one embodiment of the present invention is shown. With reference to FIG. 5, an exemplary system module for implementing embodiments includes a general purpose computing system environment, such as computing system environment 500. Computing system environment 500 may include, but is not limited to, servers (e.g., servers 106a-b), desktop computers, laptops, tablet PCs, mobile devices, and smartphones. In its most basic configuration, computing system environment 500 typically includes at least one processing unit 502 and computer readable storage medium 504. Depending on the exact configuration and type of computing system environment, computer readable storage medium 504 may be volatile (such as RAM), non-volatile (such as ROM, flash memory, etc.) or some combination of the two. Portions of computer readable storage medium 504 when executed facilitates the determination of whether a directory is primed for partitioning according to embodiments of the present invention (e.g., process 400).

Additionally, computing system environment 500 may also have additional features/functionality. For example, computing system environment 500 may also include additional storage (removable and/or non-removable) including, but not limited to, magnetic or optical disks or tape. Such additional storage is illustrated by removable storage 508 and non-removable storage 510. Computer storage media includes volatile and nonvolatile, removable and non-removable media implemented in any method or technology for storage of information such as computer readable instructions, data structures, program modules or other data. Computer readable medium 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 500. Any such computer storage media may be part of computing system environment 500.

Computing system environment 500 may also contain communications connection(s) 512 that allow it to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 512 may allow computing system environment 500 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 512 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 500 may also have input device(s) 514 such as a keyboard, mouse, pen, voice input device, touch input device, remote control, etc. Output device(s) 516 such as a display, speakers, etc. may also be included. All these devices are well known in the art and are not discussed at length.

In one embodiment, computer readable storage medium 504 includes a link update/synchronization module 507 which further includes a link count module 520, a storing module 522, a transmitting module 524, a receiving module 526, a link update module 528, and a link allocating module 530. The link update/synchronization module 507 communicates with an operating system module 506.

The link count module 520 in accordance with embodiments of the present invention determines the initial link count in a partitioned directory, e.g., by traversing the partitioned directory. The storing module 522 stores the link count in a memory component. The transmitting module 524 transmits the link count to other computers. The receiving module 526 receives a delta value associated with each computer including computer 500. The link update module 528 advantageously updates the link count based on the delta values received. The link allocating module 530 allocates a number of links to one or more of the computers which indicate the maximum number of subdirectories each system can create on its own. The number of links allocated ensures that the maximum number of allowed links within the partitioned directory is not exceeded.

Figure 6:
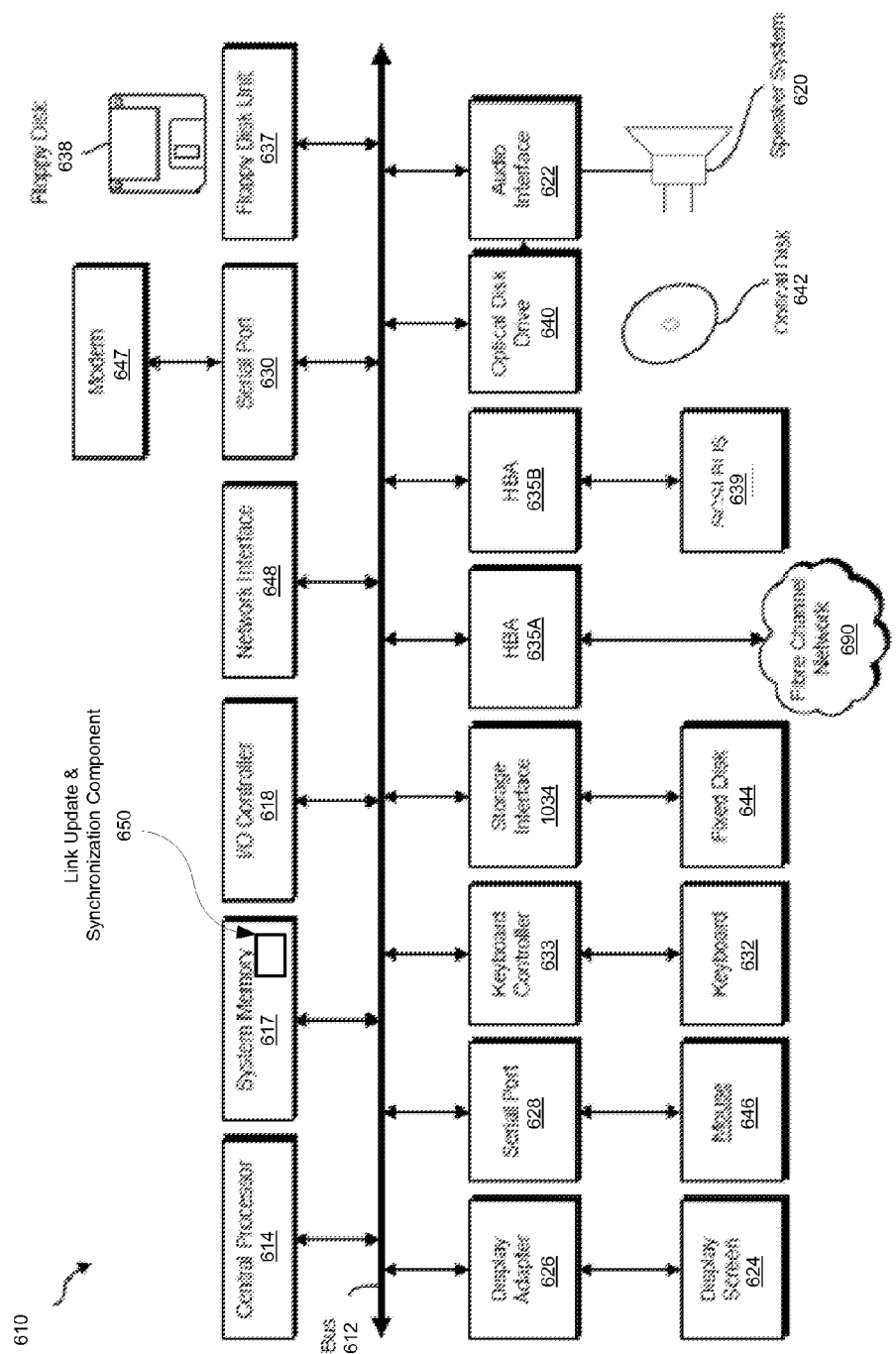
FIG. 6 shows a block diagram of another exemplary computer system in accordance with one embodiment of the present invention.

Referring now to FIG. 6, a block diagram of another exemplary computer system in accordance with one embodiment of the present invention is shown. FIG. 6 depicts a block diagram of a computer system 610 suitable for implementing the present disclosure. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612). System memory 617 includes link update and synchronization module 650 according to embodiments of the present invention.

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present disclosure. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of updating a link count of a partitioned directory, said method comprising:
    traversing said partitioned directory once to obtain an initial link count, wherein said traversing is performed by a first computer of a plurality of computers;
    broadcasting said initial link count to said plurality of computers;
    receiving a respective delta value from each of said plurality of computers representing a net number of links created and/or removed by each computer;
    updating said link count to obtain an updated link count, wherein said updating is based on said initial link count, each of said delta values and further based a delta value associated with said first computer;
    storing said updated link count in said first computer; and
    broadcasting said updated ink count to said plurality of computers.

2. The method as described in claim 1, wherein said traversing comprises counting a number of flags associated with visible directories within said partitioned directory.

3. The method as described in claim 1 further comprising:
    allocating a respective first number of links to each of said plurality of computers, wherein a total number of allocated links is less than a maximum link limit for said partitioned directory minus said initial link count, wherein each respective first number of links is decremented by one for every visible directory created by its associated computer.

4. The method as described in claim 3 further comprising:
    said first computer receiving a request from a second computer to allocate additional number of links to said second computer if a first number of links associated with said second computer reaches a threshold value.

5. The method as described in claim 4 further comprising:
    said first computer broadcasting said request to said plurality of computers;
    responsive to said broadcasting said request, said first computer receiving a second number of links from a third computer to be allocated to said second computer, wherein said second number links is deducted from said first number of links associated with said third computer; and
    said first computer, transmitting said second number of links to said second computer.

6. The method as described in claim 4 further comprising:
    in response to said request, said first computer allocating a third number of links to each of said plurality of computers, wherein said third number of links is based on a maximum limit on link count minus said link count all divided by a number of said plurality of computers.

7. The method as described in claim 1, wherein said traversing comprising said first computer obtaining an exclusive lock on said partitioned directory.

8. A non-transitory computer readable storage medium having stored thereon, computer executable instructions that, if executed by a computer system cause the computer system to perform a method of updating a link count of a partitioned directory, said method comprising:

traversing said partitioned directory once to obtain an initial link count, wherein said traversing is performed by a first computer of a plurality of computers;

computing a respective allocated link count for each computer system based on a maximum allowed link count for said partitioned directory and said initial link count;

broadcasting said allocated link counts to said plurality of computers;

receiving a delta value from each of said plurality of computers representing a net number of links created and/or removed by each computer;

updating said initial link count to obtain an updated link count, wherein said updating is based on said initial link count, each of said delta values and a delta value associated with said first computer; and broadcasting said updated link count to said plurality of computers.

9. The computer readable storage medium as described in claim 8, wherein said respective allocated link count for a particular computer is the maximum number of additional visible subdirectories allowed for that particular computer to create within said partitioned directory.

10. The computer readable storage medium as described in claim 8, wherein said computing comprises subtracting said initial link count from said maximum allowed link count to generate a subtraction result and dividing the subtraction result by the number of computers in said plurality of computers.

11. The computer readable storage medium as described in claim 10, wherein said method further comprises:

each computer of said plurality of computers decrementing its respective allocated link count for each visible subdirectory it creates; and said first computer receiving a request from a second computer to allocate additional number of links to said second computer if a respective allocated link count associated with said second computer reaches a threshold value.

12. The computer readable storage medium as described in claim 11, wherein said method further comprises:

said first computer broadcasting said request to said plurality of computers;

responsive to said broadcasting said request, said first computer receiving a second number of links from a third computer to be allocated to said second computer, wherein said second number links is deducted from a respective allocated link count associated with said third computer; and said first computer, transmitting said second number of links to said second computer.

13. The computer readable storage medium as described in claim 11, wherein said method further comprises:

in response to said request, said first computer allocating a respective revised allocated link count to each of said plurality of computers.

14. The computer readable storage medium as described in claim 8, wherein said traversing comprising said first computer obtaining an exclusive lock on said partitioned directory.

15. A system for updating a link count in a shared partitioned directory comprising:

a memory component operable to store said partitioned directory;

a plurality of computers coupled to said memory component via a file system, wherein a primary computer from said plurality of computers is operable to implement a method comprising:

traversing said partitioned directory once to obtain an initial link count during a temporary exclusive lock by said primary computer;

storing said initial ink count;

receiving a delta value from each of said plurality of computers representing a net number of links created and/or removed by each computer since said initial link count was obtained;

updating said initial link count to obtain an updated link count, wherein said updating is based on said initial link count, said delta values and a delta value associated with said primary computer;

storing said updated link count in said primary computer; and broadcasting said updated link count to said plurality of computers.

16. The system as described in claim 15, wherein said traversing comprises counting a number of flags associated with visible directories within said partitioned directory.

17. The system as described in claim 15, wherein said method further comprises allocating a respective allocated link count to each of said plurality of computers that represents the maximum number of subdirectories of the partitioned directory that an associated computer can create, wherein a total number of respective allocated link counts is less than a maximum link count limit minus said initial link count, wherein further each computer decrements its respective allocated link count for each subdirectory it creates.

18. The system as described in claim 17, wherein said method further comprises receiving a request from a second computer to allocate additional number of links to said second computer if a respective allocated link count associated with said second computer reaches a threshold value.

19. The system as described in claim 18, wherein said method further comprises:

broadcasting said request to said plurality of computers;

receiving a second number of links from a third computer to be allocated to said second computer, wherein said second number of links is deducted from a respective allocated link count associated with said third computer; and transmitting said second number of links to said second computer.

20. The system as described in claim 18, wherein said method comprises allocating a revised respective allocated link count for each of said plurality of computers based on revised delta values received from said plurality of computers.

* * * * *